United States Patent Office 3,345,187
Patented Oct. 3, 1967

3,345,187
CORROSION-INHIBITING TITANIUM DIOXIDE PIGMENTS
Kenneth Binnis, Stockton-on-Tees, England, assignor to British Titan Products Company Limited, Durham, England, a corporation of the United Kingdom
No Drawing. Filed June 9, 1965, Ser. No. 462,744
Claims priority, application Great Britain, July 31, 1964, 30,361/64
9 Claims. (Cl. 106—14)

ABSTRACT OF THE DISCLOSURE

Corrosion-inhibiting surface coating compositions, and in particular, primers, normally require the use of pigments which are highly colored. By coating titanium dioxide pigment particles with triisopropanolamine or the benzoates thereof or with the titanates or phosphates of the trialkanolamines such as triethanolamine or triisopropanolamine, an improved pigmentary product is obtained which may be used in primer coatings without the problems associated with the use of highly colored pigments.

---

The present invention relates to improved pigments for use in corrosion-inhibiting surface coating compositions and to the compositions containing them.

Corrosion-inhibiting surface coating compositions, particularly priming compositions for application to the surface of ferrous metals, suffer from a number of disadvantages. For example, the pigments having corrosion-inhibiting properties which are used in such compositions are usually highly coloured and where the structure to which the corrosion-inhibiting composition is applied is to be finished by the application of a decorative coating, for example, an oleoresinous gloss paint, it is frequently necessary to cover the corrosion-inhibiting coating composition with an undercoat of the appropriate colour before the final decorative coat can be satisfactorily applied. This is, of course, particularly necessary when the final coating is light in colour.

In addition, previously used corrosion-inhibiting pigments have a lower opacity than TiO$_2$ pigments and the present invention provides pigments of increased opacity combined with corrosion-inhibiting properties.

The pigments of the present invention are provided with a coating of corrosion-inhibiting material on the surface of the pigmentary particles, thus the corrosion-inhibiting material is placed where it achieves the greatest effect and is used most efficiently.

It is an object of this invention to provide improved pigments for use in surface coating compositions, particularly those having corrosion-inhibiting properties, and compositions containing the pigments.

Accordingly, the present invention comprises pigmentary titanium dioxide particles coated with a compound selected from triisopropanolamine and the benzoates thereof and the titanates and phosphates of an alkanolamine of the general formula

where R represents a divalent aliphatic radical which may be the same or different containing 2 or 3 carbon atoms.

The invention also includes a process comprising coating pigmentary titanium dioxide particles with compounds selected from the above group and surface coating compositions containing the coated pigmentary titanium dioxide particles of the present invention.

The titanium dioxide particles of the present invention are preferably of pigmentary size, for example having a mean weight particle size in the range 0.15 micron to 0.35 micron and particularly in the range 0.2 micron to 0.3 micron. Where they are predominantly of the rutile modification they should preferably contain at least 90% and preferably at least 95% of this form.

The particles may or may not be coated with materials other than those of the present invention but it is preferred that there should be present on the particles a coating of at least one other material, for example a metal oxide (which term includes silica).

Examples of metal oxides which may be present are oxides of aluminium, titanium, cerium, zirconium and/or silicon. Such oxides are conveniently applied, either singly or in combination, before the coatings of the present invention, in amounts in the range from 0.1% to 5%, particularly from 0.5% to 3% (by weight on TiO$_2$).

The pigment particles may also be coated with a phosphate, for example of aluminium, titanium, zirconium or cerium. An amount of phosphate (as P$_2$O$_5$) in the range 0.1% to 3%, by weight on TiO$_2$, has been found very suitable.

The presence of a coating of material such as a metal oxide, particularly of aluminium oxide, is believed to assist in forming a surface upon the particles which is particularly receptive to the coatings of the present invention.

The coating compounds of the present invention may be liquids or solids, for example triethanolamine titanate and phosphate are normally viscous liquids. Tri-isopropanolamine is normally a solid of low melting point, and the titanate of this compound is generally a liquid and the phosphate a solid. The benzoate is a water-soluble compound which may be conveniently made by mixing the base and benzoic acid in water to give an aqueous solution of the compound.

The compound may, of course, exist in different physical forms depending upon the conditions, for example, the temperature. In the case of the titanates, at least, the physical form (i.e. liquid or solid) may also depend upon the degree of polymerisation and the most convenient method of applying the compounds to the titanium dioxide particles will depend upon the properties of the available product.

Where the compound can be applied at temperatures in the range of about 80° C. to 250° C. it is very convenient to apply the material during fluid energy milling of the titanium dioxide by introducing the material into the mill either with the pigment or separately. Alternatively, the compound may be applied in solution in an organic solvent or in water or, where appropriate, they may be melted and applied in the liquid state. Under such circumstances the solution or melt may be poured or sprayed onto the particles, preferably before milling the particles to break down aggregates which may be formed during the addition. Triisopropanolamine benzoate is preferably applied to the pigment in aqueous solution.

Sufficient of the compound is preferably applied to the pigment particles by any suitable method to allow the particles to retain, an amount of the added compound in the range of about 0.5% to 5% particularly an amount in the range 1% to 3%, by weight on TiO$_2$.

The surface coating compositions containing the coated titanium dioxide particles of the present invention are generally priming compositions containing an organic film-forming material which may, for example, be an alkyd resin or modified alkyd resin such as an oil- or epoxy-modified resin or an oil medium such as linseed oil or a modified oil medium such as epoxy-modified oil. They may be air drying or stoving compositions.

If desired, water-soluble or water-dispersible resins may be used as the film-forming material, for example media containing alkyd-amino, melamine-acrylic or water-soluble acrylic or phenolic based resins.

The coated titanium dioxide particles are normally present in the coating composition in a pigment volume concentration in the range of about 15% to 50%, particularly one in the range 25% to 35%.

The pigments of the present invention retain the inhibiting properties of the tri-isopropanolamine or alkanolamine compound with the high opacity and high degree of whiteness of the $TiO_2$ which enables them to be more readily covered by a decorative coating. Because of the latter properties it may be possible, when using the compositions of the present invention, to dispense with an undercoat.

Furthermore, the amount of tri-isopropanolamine or alkanolamine compound of the present invention required to give acceptable corrosion-inhibition, is much reduced since in the present invention it is present only in the form of a layer on the surface of the titanium dioxide particles where it is most effective for its purpose and where it is then used most efficiently.

The following examples show embodiments of the present invention.

EXAMPLE 1

A solution of triethanolamine titanate in alcohol (85%) was allowed to drip onto a belt feed carrying rutile titanium dioxide particles which had already been coated with alumina (1.5%), titania (1.12%) and silica (0.5%) to a hopper from which the material was supplied to a fluid energy mill by steam injection. Sufficient triethanolamine titanate was added to the particles in this manner to allow the retention on the pigment, after fluid energy milling of about 3.2% of triethanolamine titanate (by weight on $TiO_2$).

The fluid energy milling was carried out using steam at 100 p.s.i.g.

EXAMPLE 2

The process described in Example 1 was repeated applying the following compounds in the form noted and in sufficient quantity to allow the retention, after milling, of the concentration shown.

| Compound | Form in which compound is added | Amount retained after milling (percent by weight on $TiO_2$) |
| --- | --- | --- |
| Triethanolamine phosphate | As a liquid at 60° C | 1.2 and 2.3. |
| Tri-isopropanolamine | do | 3. |
| Tri-isopropanolamine titanate | 80% solution in isopropylalcohol | 1. |
| Tri-isopropanolamine benzoate | Aqueous solution containing 10% water | 0.64. |

The coated titanium dioxide pigments thus produced were mixed at 32% pigment volume concentration with a medium oil length linseed oil-modified alkyd resin and the coating compositions thus produced were separately applied to burnish mild steel panels 6" x 4" to give a dry film thickness of about 20 microns.

The panels, after standing for 7 days at 20° C. in a relative humidity of 65, were scratched with a cross through the paint film and were then exposed (in quintuplicate) in a heavily polluted industrial atmosphere for a period of 12 months. Under these conditions the compositions containing the pigment of the present invention were found to be generally as effective as similar coating compositions containing red lead and better than compositions containing zinc chromate and calcium plumbate which are well known coloured corrosion-inhibiting pigments.

Similar coating compositions containing rutile titanium dioxide particles coated with equal quantities of alumina, titania and silica but without the organic coatings of the present invention were also tested under the same conditions.

The results obtained in the exposure tests are given in the table at the end of this specification.

Coated panels using the pigments of the present invention and prepared in a similar manner to that described above were also subjected to the following tests.

Test I

This was a salt spray test as set out in Defence Specification DEF 1053, No. 24 using an intermittent salt spray which was applied for a total of 336 hours in a 3 week period.

Test II

This was similar to Test I but the salt spray, which was made up to simulate rain water in a heavily polluted industrial area, contained the following ingredients.

|   | G. |
| --- | --- |
| Ammonium sulphate | 7.10 |
| Calcium chloride (anhyd.) | 12.00 |
| Sodium sulphite | 16.30 |
| Sodium sulphate | 12.40 |
| Potassium nitrate | 0.065 |
| Potassium nitrite | 0.074 |

Water to 20 litres.

This spray had a pH value of about 4.

Spraying with this solution provides a much more rigorous test of anticorrosion properties than does that given under Test I.

Similar tests were also carried out on similar coating compositions which contained:

(a) Zinc chromate pigment
(b) Calcium plumbate pigment
(c) Red lead pigment

The results obtained with Tests I and II and in the exposure test were graded A, B and C against the results of the panels which were coated with the paint composition containing rutile $TiO_2$ pigment coated with 1.5% alumina, 1.12% titania and 0.5% silica but without any organic coating.

The categories A, B and C varied in each test and they are noted at the foot of each table.

TEST I

| Order of Performance | Pigment | Organic Coating | Amount of Organic Coating, Percent | Category |
| --- | --- | --- | --- | --- |
| 1 | $TiO_2$ | Triethanolamine titanate | 3.3 | A |
| 2 | Calcium plumbate | | | A |
| 3 | Zinc Chromate | | | A |
| 4 | $TiO_2$ | Triethanolamine titanate | 1.2 | A |
| 5 | $TiO_2$ | Tri-isopropanolamine | 0.6 | A |
| 6 | $TiO_2$ | Tri-isopropanolamine | 3 | A |
| 7 | $TiO_2$ | Triethanolamine phosphate | 1.2 | A |
| 8 | Red lead | | | B |
| 9 | $TiO_2$ | | | C |

NOTE.—Category A corrosion estimated as 0-20% of standard; category B corrosive estimated as 20-50% of standard; category C corrosion estimated as 50-100% of standard.

TEST II

| Order of Performance | Pigment | Organic Coating | Amount of Organic Coating, Percent | Category |
|---|---|---|---|---|
| 1 | TiO$_2$ | Triethanolamine titanate | 3.2 | A |
| 2 | Calcium plumbate | | | A |
| 3 | TiO$_2$ | Triethanolamine phosphate | 2.3 | A |
| 4 | Red lead | | | A |
| 5 | TiO$_2$ | Tri-isopropanolamine | 3 | A |
| 6 | TiO$_2$ | Tri-isopropanolamine | 0.65 | B |
| 7 | TiO$_2$ | Triethanolamine titanate | 1.2 | B |
| 8 | TiO$_2$ | | | C |
| 9 | ZnCrO$_4$ | | | C |

NOTE.—Category A corrosion estimated as 0 to 70% of standard; category B corrosion estimated as 70 to 90% of standard; Category C corrosion estimated as 90 to 100% of standard.

(This test, as previously noted, is very rigorous.)

The results of the exposure tests given in column 4 of this specification are shown in the table below.

The results of similar tests with paints containing red lead, zinc chromate and calcium plumbate pigments prepared as for Test II are also given.

ATMOSPHERE IN HEAVILY POLLUTED AREA

| Order of Performance | Pigment | Organic Coating | Amount of Organic Coating, Percent | Category |
|---|---|---|---|---|
| 1 | {TiO$_2$ | Triethanolamine phosphate | 2.3 | A |
|   | Red lead | do | | A |
| 3 | TiO$_2$ | Triethanolamine titanate | 1.2 | A |
| 4 | TiO$_2$ | Triethanolamine phosphate | 1.2 | A |
| 5 | TiO$_2$ | Tri-isopropanolamine | | A |
| 6 | Zinc chromate | do | | B |
| 7 | Calcium plumbate | do | | B |
| 8 | TiO$_2$ | do | | C |

NOTE.—Category A corrosion estimated as 0% to 25% of standard; category B corrosion estimated as 25% to 60% of standard; category C corrosion estimated as 60% to 100% of standard.

The pigments of the present invention, when incorporated into the surface coating compositions had in all cases markedly superior opacity when compared with the other pigments tested.

What is claimed is:

1. Pigmentary titanium dioxide particles coated with a compound selected from the group consisting of the titanates of alkanolamines of the general formula

wherein each of the R's are separately selected from the group consisting of divalent aliphatic radicals containing two carbon atoms and divalent aliphatic radicals containing three carbon atoms.

2. Coated pigmentary titanium dioxide particles in accordance with claim 1 wherein said coating consists essentially of triethanolamine titanate.

3. Coated pigmentary titanium dioxide particles in accordance with claim 1 wherein said coating consists essentially of triisopropanolamine titanate.

4. Pigmentary titanium dioxide particles as claimed in claim 1 wherein the particles have a mean weight crystal size in the range 0.15$\mu$ to 0.35$\mu$.

5. Pigmentary titanium dioxide particles as claimed in claim 1 wherein the coating is present on the particles in an amount in the range 0.5% to 5% (by weight on TiO$_2$).

6. Coated pigmentary titanium dioxide particles in accordance with claim 1 wherein the particles additionally have a coating of an oxide selected from the group consisting of alumina, titania, ceria, zirconia and silica intermediate said titanium dioxide particle and said trialkanolamine titanate coating.

7. A paint composition consisting of an organic film-forming medium and pigmentary titanium dioxide particles as claimed in claim 1.

8. A paint composition as claimed in claim 7 wherein the organic film-forming medium is selected from the group consisting of linseed oil, a modified linseed oil, an alkyd resin, a modified alkyd resin, an alkyd amino-, a melamine acrylic-, a water-soluble acrylic- and a phenolic-based-resin.

9. A paint composition as claimed in claim 7 wherein the pigment volume concentration is in the range 15% to 50%.

References Cited

UNITED STATES PATENTS

| | | | |
|---|---|---|---|
| 1,936,533 | 11/1933 | Albrecht | 106—14 |
| 2,308,282 | 1/1933 | Howland | 106—14 |
| 2,671,031 | 3/1954 | Whatley | 106—300 |
| 2,819,174 | 1/1958 | Vortanian | 106—308 |
| 3,015,573 | 2/1962 | Meyer | 106—308 |
| 3,172,772 | 3/1965 | Rowe | 106—308 |

JULIUS FROME, *Primary Examiner.*